US008471962B2

United States Patent
Deng et al.

(10) Patent No.: US 8,471,962 B2
(45) Date of Patent: Jun. 25, 2013

(54) APPARATUS AND METHOD FOR LOCAL VIDEO DETECTOR FOR MIXED CADENCE SEQUENCE

(75) Inventors: Xiaoyun Deng, Singapore (SG); Lucas Hui, Singapore (SG)

(73) Assignee: STMicroelectronics Asia Pacific Pte Ltd., Singapore (SG)

( * ) Notice: Subject to any disclaimer, the term of this patent is extended or adjusted under 35 U.S.C. 154(b) by 22 days.

(21) Appl. No.: 13/174,194

(22) Filed: Jun. 30, 2011

(65) Prior Publication Data

US 2013/0002957 A1  Jan. 3, 2013

(51) Int. Cl.
*H04N 11/20* (2006.01)
*H04N 5/14* (2006.01)

(52) U.S. Cl.
USPC .................. 348/701; 348/448; 348/452

(58) Field of Classification Search
USPC .......... 348/448, 452, 699–701, 97, 441, 348/607, 678, 687; 382/190, 195, 224, 274, 382/275
See application file for complete search history.

(56) References Cited

U.S. PATENT DOCUMENTS

| | | | |
|---|---|---|---|
| 5,347,314 A * | 9/1994 | Faroudja et al. | 348/448 |
| 6,628,341 B1 * | 9/2003 | Staley et al. | 348/607 |
| 6,680,752 B1 * | 1/2004 | Callway et al. | 348/448 |
| 7,075,581 B1 * | 7/2006 | Ozgen et al. | 348/448 |
| 7,405,766 B1 * | 7/2008 | Chou et al. | 348/448 |
| 2006/0171457 A1 * | 8/2006 | DeGarrido et al. | 375/240.03 |
| 2006/0268168 A1 * | 11/2006 | Au et al. | 348/448 |
| 2007/0296858 A1 | 12/2007 | Eymard et al. | |
| 2008/0062307 A1 * | 3/2008 | Zhai et al. | 348/448 |
| 2008/0062308 A1 * | 3/2008 | Zhai et al. | 348/448 |
| 2008/0106642 A1 * | 5/2008 | Srinivasan et al. | 348/452 |
| 2008/0181517 A1 * | 7/2008 | Aokage | 382/236 |
| 2008/0278623 A1 * | 11/2008 | Lu et al. | 348/452 |
| 2009/0167938 A1 * | 7/2009 | Matsuoka et al. | 348/448 |
| 2009/0244370 A1 * | 10/2009 | Tang | 348/452 |
| 2009/0322940 A1 * | 12/2009 | Kempf | 348/448 |
| 2011/0019083 A1 * | 1/2011 | Cordes et al. | 348/441 |

* cited by examiner

Primary Examiner — Victor Kostak

(74) Attorney, Agent, or Firm — Hogan Lovells US LLP

(57) ABSTRACT

Aspects of the invention are directed towards an apparatus and method for detecting local video pixels in mixed cadence video. The local video detector comprises a comb detector that is adaptive to the contour of moving objects and local contrast, a motion detector that is robust to false motion due to vertical details, and a fader value estimator that provides a video confidence value to a fader that combines film mode and video mode processing results. The coupling of the local video detector to a film mode detector increases the robustness, accuracy, and efficiency of local film/video mode processing as compared to the prior art.

40 Claims, 10 Drawing Sheets

US 8,471,962 B2

APPARATUS AND METHOD FOR LOCAL VIDEO DETECTOR FOR MIXED CADENCE SEQUENCE

RELATED APPLICATIONS

The present application relates to co-pending U.S. patent application Ser. No. 12/978,154, filed on Dec. 23, 2010, and U.S. patent application Ser. No. 13/174,413, filed concurrently.

BACKGROUND OF THE INVENTION

1. Field of the Invention

This invention generally relates to an apparatus and method for local video detection for mixed cadence sequence, and more particularly to a pixel-based Local Video Detection (LVD) method and system used as part of the Local Film Mode Detector (LFMD), or part of the de-interlacer, or part of the picture quality enhancement in TV and Set-Top-Box products.

2. Relevant Background

Interlaced video was used for cathode ray tube (CRT) displays and is found throughout a number of broadcasting formats. Modern video displays, e.g., liquid crystal displays (LCD) and plasma displays, do not operate in interlaced mode. Therefore, de-interlacing circuitry is needed in set-top-box (STB)/TV to de-interlace video into progressive video that can be played on modern video displays.

Currently, there are a number of different source formats. Video formats usually display at 50 or 60 frames per second; film formats are commonly captured at 24 or 25 frames per second. Because of the difference is frame rate, telecine is applied to a film source video in order to properly display the film source video on a video display. Reverse telecine may be applied to the telecined film source video to recover a higher quality non-interlaced video to display on a compatible device, such as a modern video display.

U.S. patent application Ser. No. 12/978,154, "Apparatus and Method for Exotic Cadence Detection," discusses an apparatus and method for exotic cadence detection. Cadence detection finds the source format of a sequence of video fields or detects the absence of motion between frames (still pictures) and determines whether a video is originally from a video or film source that had interlacing or telecine applied. After that, de-interlacing or inverse telecine can be appropriately applied to the video.

Cadence detection systems in the related art have limited applicability to broadcasted videos. Broadcasted videos commonly consist of mixed video and film sources, for example, graphics overlay on a video source, or scrolling text on a film source. Applying either de-interlacing or inverse telecine to mixed cadence sources is suboptimal because de-interlacing compromises vertical resolution on the telecined parts and inverse telecine leaves unhandled feathering or combing artifacts on the interlaced parts.

U.S. Patent Publication No. 2007/0291169, "Region-Based Cadence Detector," discusses blocked based film/video decision and switching. A frame is segmented into a pre-set number of regions (or clusters of blocks) for cadence and phase tracking. Region-based cadence detection suffers in picture quality and robustness due to artifacts from the switching.

Accordingly, there is a need in the art for an accurate, robust, and efficient mixed film/video mode cadence detection system.

SUMMARY OF THE INVENTION

Accordingly, the invention is directed to an apparatus and method for local film/video mode processing system that substantially obviates one or more of the problems due to limitations and disadvantages of the related art.

An advantage of the invention is to provide an apparatus and method to increase detection accuracy and to prevent feathering/comb artifacts on moving video object areas.

Another advantage of the invention is to increase the robustness of local film mode detection to improve picture quality of mixed cadence sources.

Yet another advantage of the invention is to avoid global, block, or region-of-block based decisions on mixed film and video sequences to prevent switch artifacts.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the invention, as embodied and broadly described, an apparatus for local video detection is provided. The apparatus includes a contour and contrast adjusted comb detector, a false motion excluded motion detector, and a video fader value estimator.

In one embodiment of the invention, the contour and contrast adjusted comb detector includes a field to frame coupling unit, a directional support pixel extraction unit, a comb detection unit, a comb post-processing unit, a comb value estimation unit, and a contrast adjustment unit. The false motion excluded motion detector includes an inter-frame motion detection unit, an inter-field motion detection unit, a false motion exclusion unit, and a motion post-processing unit. The video fader value estimator includes a pixel classification unit, a video value calculator, and a video value post-processing unit.

Another aspect of the invention is directed towards a mixed film/video mode detection apparatus. The mixed film/video mode detection apparatus includes a film mode detector, a local video detector, a film mode processing unit, and a video mode processing unit and a fader.

Yet another aspect of the invention is directed towards a method for local film/video mode processing. The method includes the steps of detecting a cadence and phase information from an input video, calculating pixel-based video confidence values of the input video based on the cadence and phase information, performing film mode processing on the input video, performing video mode processing on the input video, and fading between the film mode and video mode processing according to the pixel-based video confidence values.

It is to be understood that both the foregoing general description and the following detailed description are exemplary and explanatory and are intended to provide further explanation of the invention as claimed. In addition, various aspects of the invention may be generated with software or hardware as known in the art.

DETAILED DESCRIPTION OF THE PREFERRED EMBODIMENTS

Embodiments of the present invention are hereafter described in detail with reference to the accompanying figures. Although the invention has been described and illustrated with a certain degree of particularity, it is understood that the present disclosure has been made only by way of example and that numerous changes in the combination and arrangement of parts can be resorted to by those skilled in the art without departing from the spirit and scope of the invention.

The following description with reference to the accompanying figures is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but are merely used by the inventor to enable a clear and consistent understanding of the invention. Accordingly, it should be apparent to those skilled in the art that the following description of exemplary embodiments of the present invention are provided for purposes of illustration only and not for the purpose of limiting the invention as defined by the appended claims and their equivalents.

Reference will now be made in detail to an embodiment of the present invention, an example of which is illustrated in the accompanying drawings.

Figure 1:
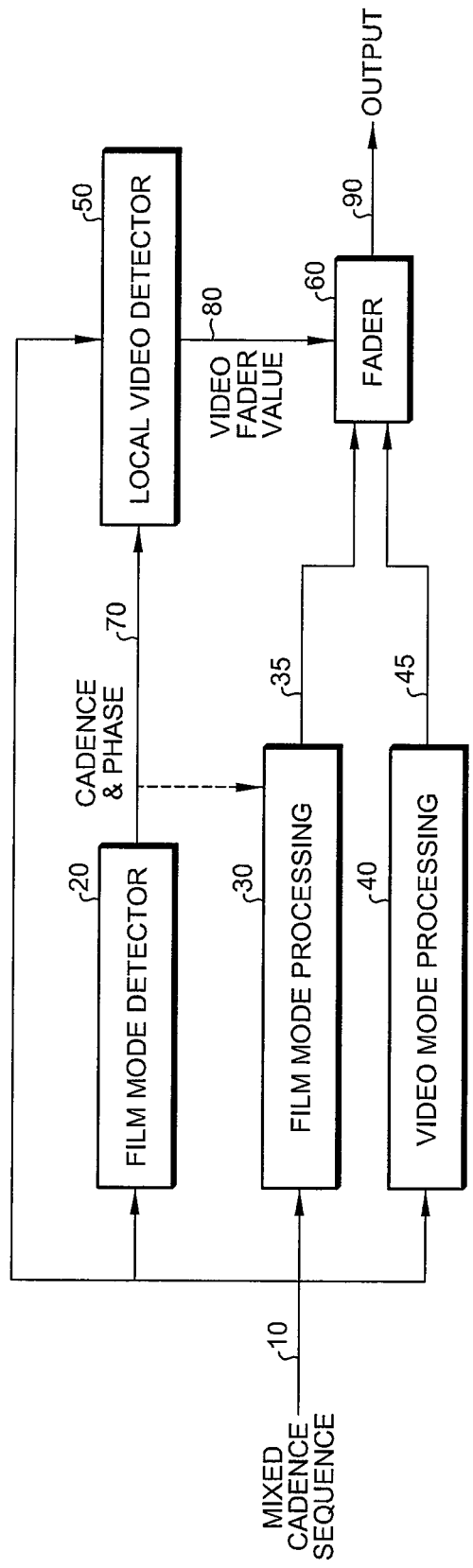
FIG. 1 illustrates an exemplary diagram of a video processing system that makes use of a local video detector for optimally displaying a mixed cadence video sequence according to an embodiment of the invention.

FIG. 1 illustrates a video processing system that makes use of a local video detector for optimally displaying a mixed cadence video sequence according to an embodiment of the invention.

The video processing system receives an input video signal 10, which could contain film or video source, or a mix of both, and outputs the processed video 90 for displaying on modern LCD/LED TVs. The video processing system comprises a film mode detector 20, a local video detector 50, a film mode processing unit 30, also known as "inverse telecine", a video mode processing unit 40, also referred to as "de-interlacer", and a fader unit 60.

The film mode detector 20, such as one disclosed U.S. patent application Ser. No. 12/978,154, detects the cadence and the phase of the film source, if there is any, and provides such cadence and phase information 70 to the local video detector 50 and the film mode processing unit 30. The local video detector 50 receives the input video signal 10, the cadence and phase information 70, and provides a pixel-based video fader value 80 to the fader 60. The film mode processing unit 30 receives the input video signal 10, interweaves the coupling of two fields according to the cadence and phase information 70 from the film mode detector 20, and outputs the merged video frame 35 to the fader 60. The video mode processing unit 40 receives the input video signal 10, interpolates it spatially and/or temporally, and outputs an interpolated frame 45 to the fader 60. Finally, the fader 60 receives the outputs from the film mode processing unit 30 and the video mode processing unit 40, then fades between them based on the video fader value 80 estimated by the local video detector 50, and outputs the final video output 90 for display.

Figure 2:
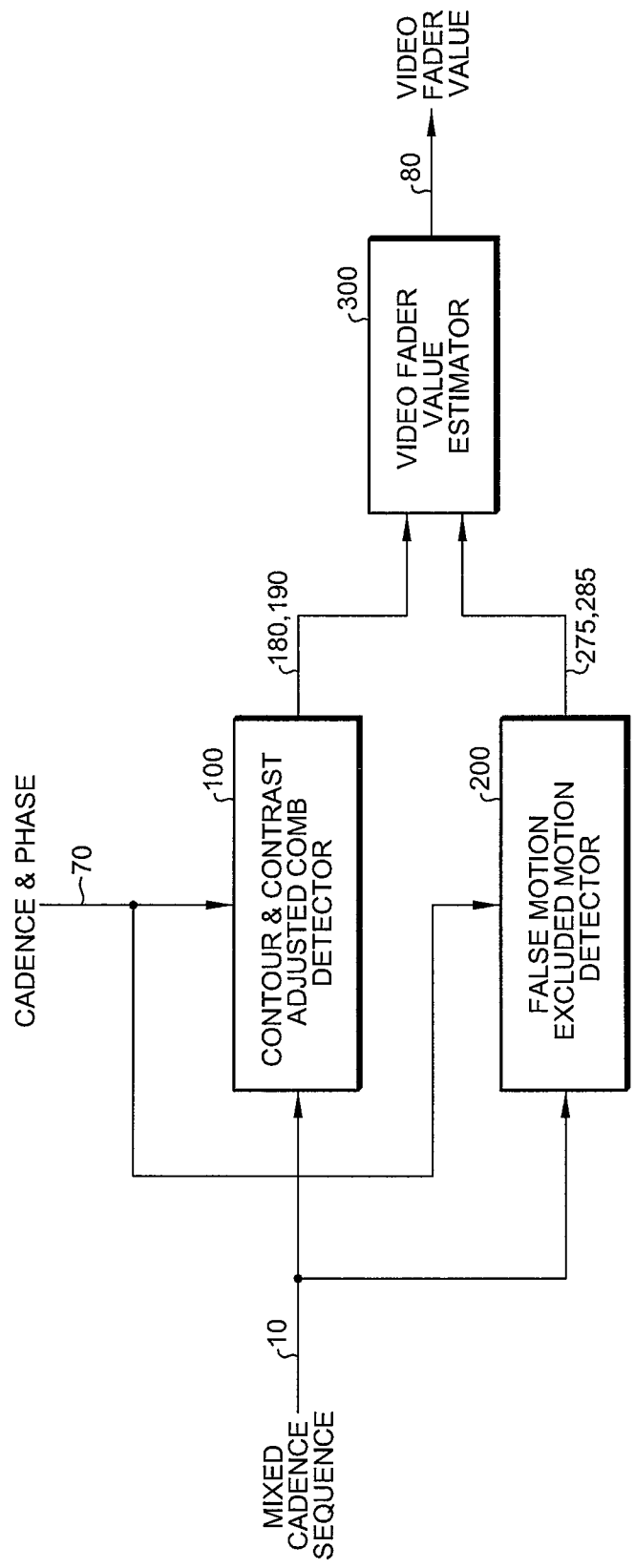
FIG. 2 is an exemplary diagram of a local video detector according to an embodiment of the invention.

Referring now to FIG. 2, there is illustrated in diagram an embodiment of a local video detector 200 according to an embodiment of the invention.

The local video detector receives the input video signal 10 and the cadence and phase information 70, and outputs the video fader value 80. The local video detector apparatus comprises a contour and contrast adjusted comb detector 100, a false motion excluded motion detector 200, and a video fader value estimator 300.

Figure 3:
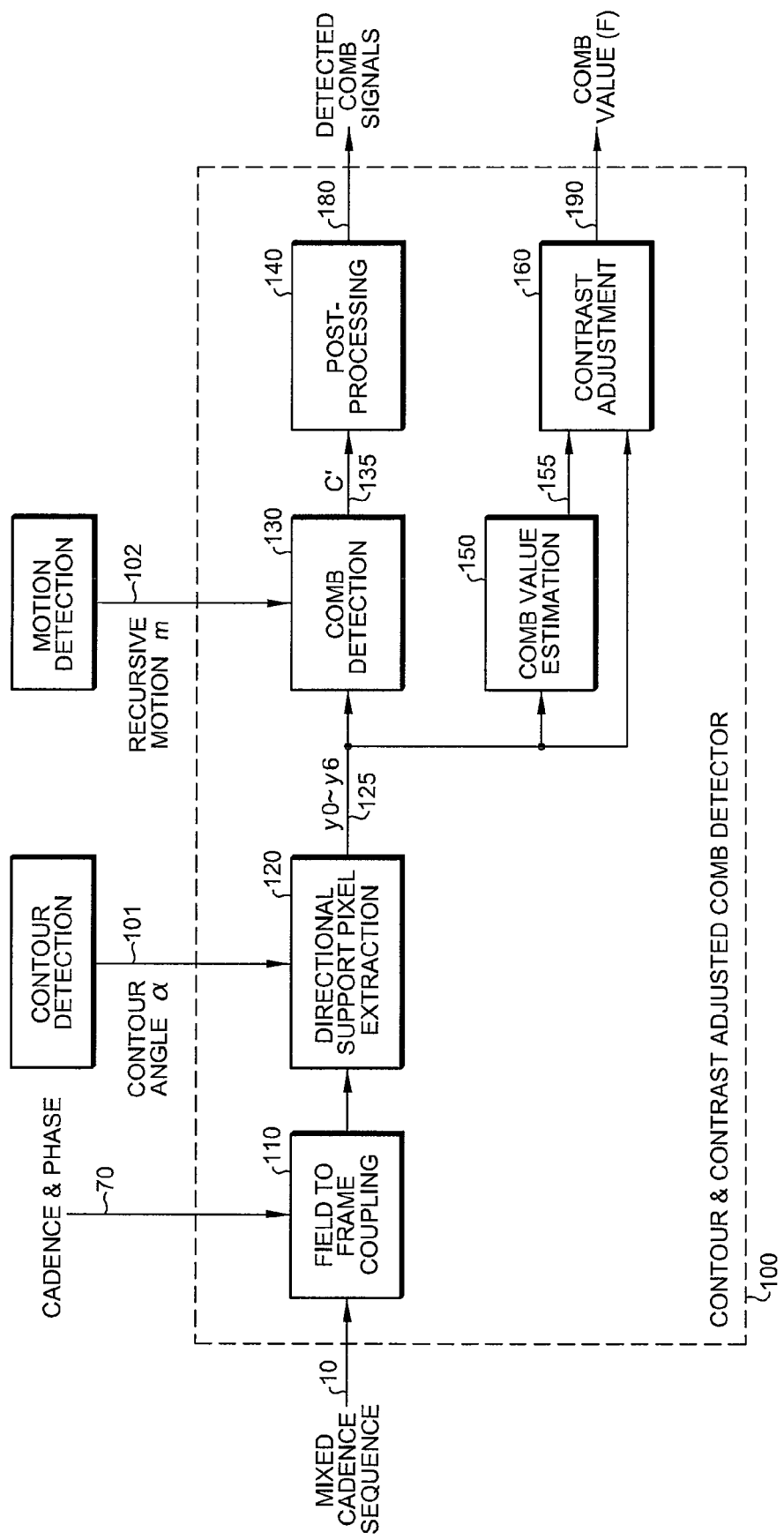
FIG. 3 is an exemplary diagram of a contour and contrast adjusted comb detector according to an embodiment of the invention.

Referring now to FIG. 3, there is illustrated in diagram an embodiment of a contour and contrast adjusted comb detector 100.

Contour and contrast adjusted comb detector 100 receives the input video signal 10, the cadence and phase information 70, a contour angle α 101 from an external contour detector, and a recursive motion m 102 from an external motion detector, and provides the detected comb signals 180 and a comb value 190. Contour and contrast adjusted comb detector 100 further comprises a field to frame coupling unit 110, a directional support pixel extraction unit 120, a comb detection unit 130, an optional post-processing unit 140, a comb value estimation unit 150, and an optional contrast adjustment unit 160.

The field to frame coupling unit 110 receives three fields of the input video signal 10 at times t−1, t, and t+1, and merges two fields belonging to the same frame (either t−1 & t, or t & t+1) according to the cadence and phase information received from an external film mode detector to generate a complete frame.

Figure 4:
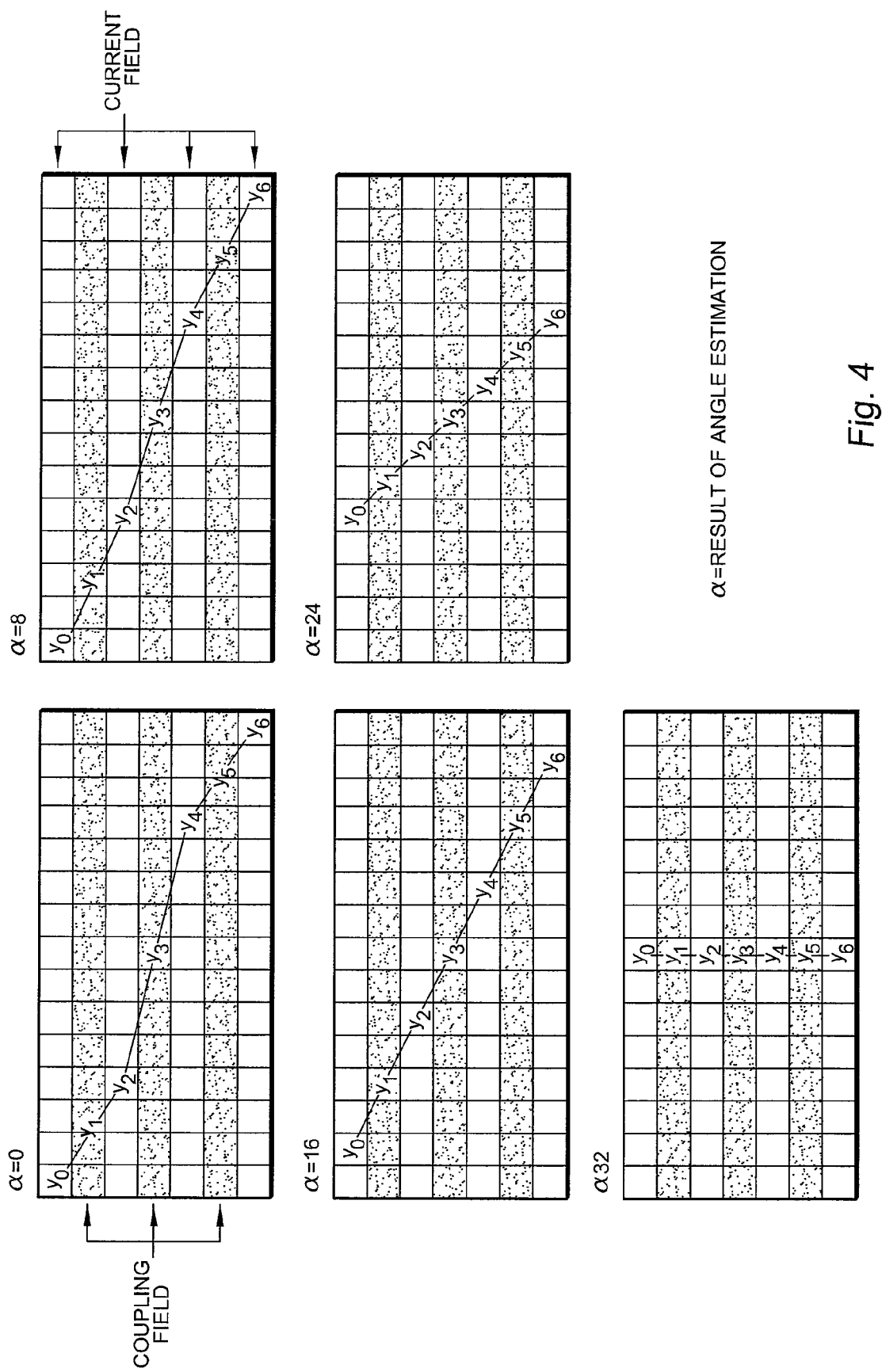
FIG. 4 is a diagram illustrating examples of contour adjusted support pixel extraction.

The directional support pixel extraction unit 120, receives a complete frame from the field to frame coupling unit 110 and a contour angle signal 101 estimated on the field at time t from an external contour detector, which could be part of a video mode processing unit in many cases, and provides a seven-pixel window 125. An example of the external contour detector providing contour angle α 101 is disclosed in U.S. Pat. No. 7,773,151. As combing artifacts appear along the contours of a moving object, a directional support pixel extraction unit could greatly improve the accuracy of a comb detector, as can be appreciated by the skilled addressee. Some examples of the directional support pixel extraction based on the estimated contour angle α 101 are shown in FIG. 4.

Figure 5:
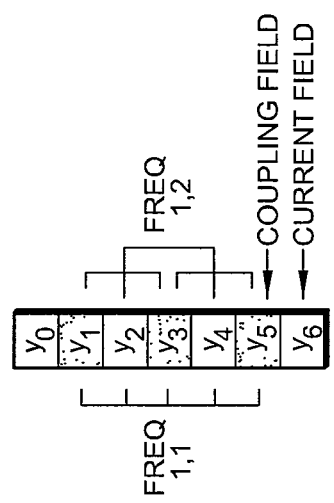
FIG. 5 is a diagram illustrating a pixel window used by a comb detection unit, a comb value estimation unit, and a contrast adjustment unit.

The comb detection unit 130 then receives the seven-pixel window 125 as shown in FIG. 5, including even-numbered pixels from the current field and odd-numbered pixels from the coupling field. It also receives the recursive motion m 102 from an external motion detector, and provides a moving comb signal 135. An example of the external motion detector providing recursive motion m 102 is disclosed in U.S. Pat. No. 7,193,655.

An example method of moving comb detection processed by comb detection unit 130 is illustrated with reference to Equation 1, 2, and 3.

$$vfreq_k = \begin{cases} freq_{k,1} - freq_{k,2} & fielddiff_k \geq MonotoneTh \\ 0 & otherwise \end{cases} \quad \text{Eqn 1(a)}$$

$$k = 0, 1, 2$$

where $$freq_{k,1} = \sum_{i=0}^{3} ((y_{k+i} - mean_k) \cdot (y_{k+i+1} - mean_k) < 0) \quad \text{Eqn 1(b)}$$

$$freq_{k,2} = \sum_{i=0}^{2} ((y_{k+i} - mean_k) \cdot (y_{k+i+2} - mean_k) < 0) \quad \text{Eqn 1(c)}$$

$$mean_k = ((y_k + y_{k+2} + y_{k+4}) \times 2 + (y_{k+1} + y_{k+3}) \times 3 + 6)/12 \quad \text{Eqn 1(d)}$$

and $$fielddiff_k = |(y_k + y_{k+2} + y_{k+4}) \times 2 - (y_{k+1} + y_{k+3}) \times 3|/12 \quad \text{Eqn 1(e)}$$

In Equation 1, comb pixels are detected by evaluating the local vertical frequency. One should note that 'vertical frequency' referenced here actually means 'directional frequency' as a directional support pixel extraction unit has been used previously. The vertical frequency, represented by $vfreq_k$, is calculated by the vertical frequency of consecutive pixels in a frame ($freq_{k,1}$), subtracted by the vertical frequency of pixels in a field ($freq_{k,2}$). To calculate the vertical frequency $freq_{k,1}$ and $freq_{k,2}$, the number of pixels having different signs when they are subtracted by the local mean value would be summed, as in Equation 1(b) and (c). The local mean value $mean_k$, calculated as in Equation 1(d), represents the mean value of two coupling fields at the center pixel. One of ordinary skill in the art would understand that by subtracting the vertical frequency of pixels in a field from the vertical frequency of pixels in a frame, the comb effect could be detected with less interference from high frequency details of the picture content. Finally, for immunity to noise at monotone area, the vertical frequency $vfreq_k$ is set to zero if the average difference of two fields $fielddiff_k$ calculated in Equation 1(e) is lower than a monotone threshold MonotoneTh, as in Equation 1(a).

$$C = \begin{cases} \max(vfreq_0, vfreq_1) & topfield \\ \max(vfreq_1, vfreq_2) & bottomfield \end{cases} \quad \text{Eqn 2}$$

$$C' = \begin{cases} C & m \geq MotionTh \\ 0 & otherwise \end{cases} \quad \text{Eqn 3}$$

where m is the recursive motion

Equation 2 is optional to take the comb pixels of the neighboring field into account. Equation 3 is to exclude the stationary 'comb' pixels from the final moving comb signal C' to improve the comb detection accuracy, since stationary 'comb' pixels could only be false alarms.

Figure 6:
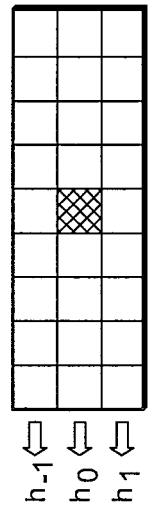
FIG. 6 is a diagram of an example processing window of a comb post-processing unit.

The optional comb detection post-processing unit 140 is configured to receive a plurality of the detected comb signals C' from comb detection unit 130, and provides a post-processed comb signal 180 to the video fader value estimator 300 for more robust comb detection. An example embodiment of the comb detection post-processing is illustrated in Equation 4(a) to (f) with its local processing window shown in FIG. 6.

$$c\_mid1 = \left(\sum_{i=-1}^{1} l_i \geq DirCombCntThM\right) \& \quad \text{Eqn 4(a)}$$

$$\left(\sum_{i=-1}^{1} (h_i > 0) \geq DirCombCntInRowTh\right)$$

$$c\_mid2 = (\min(C'_{i-1,j}\ C'_{i,j}\ C'_{i+1,j}) \geq DirCombThH) \quad \text{Eqn 4(b)}$$

$$c\_mid = c\_mid1 | c\_mid2 \quad \text{Eqn 4(c)}$$

$$c\_low = \left(\sum_{i=-1}^{1} l_i \geq DirCombCntThL\right) \quad \text{Eqn 4(d)}$$

where $$h_i = \sum_{j=-4}^{4} (C'_{i,j} > DirCombThH)\ i \in [-1, 1] \quad \text{Eqn 4(e)}$$

$$l_i = \sum_{j=-4}^{4} (C'_{i,j} > DirCombThL)\ i \in [-1, 1] \quad \text{Eqn 4(f)}$$

According to the embodiment, comb detection post-processing 140 selects a bigger window within the locale of a target comb pixel to determine how densely combing pixels are located near the target comb pixel. As a result, comb detection accuracy is further improved as the target comb pixel can be confirmed and higher confidence is obtained. Comb detection post-processing according to the embodiment calculates and outputs c_mid and c_low as the detected comb signals 180.

The comb value estimation unit 150 is configured to receive the seven-pixel window 125 as in FIG. 5, and provides the calculated comb value 155. An example comb value estimation method is illustrated in Equation 5(a) to (c), and Equation 6 is optional to take the comb values of the neighboring field into account.

$$f_k = (3 \times a_{k,1} - 4 \times a_{k,2})/12\ k \in [0, 2] \quad \text{Eqn 5(a)}$$

where $$a_{k,1} = \sum_{i=k}^{k+3} |y_i - y_{i+1}| \quad \text{Eqn 5(b)}$$

$$a_{k,2} = \sum_{i=k}^{k+2} |y_i - y_{i+2}| \quad \text{Eqn 5(c)}$$

$$f = \max(f_0, f_1, f_2) \quad \text{Eqn 6}$$

Equation 5(a) calculates $f_k$, the detail compensated comb value, where the comb value in frame is $a_{k,1}$ in Equation 5(b) and the details in field is $a_{k,2}$ in Equation 5(c). Equation 6 further takes into account the maximum comb value of the two fields at three vertically adjacent center positions as the actual comb value.

The optional contrast adjustment unit 160 then receives the same seven-pixel window 125 and the calculated comb value 155, and provides a contrast adjusted comb value 190 for the low contrasted but highly confident comb pixels. Contrast adjustment is needed to enhance certain low contrast pixels for better result. An example contrast adjustment method is illustrated in Equation 7(a) to (c).

$$F = \begin{cases} \max(MinContrast, f) & \max(|b_0|, |b_1|, |b_2|) \geq 4 \\ f & \text{otherwise} \end{cases} \quad \text{Eqn 7(a)}$$

where $$b_k = \sum_{i=k}^{k+3} \text{sign}(y_i, y_{i+1}, DTh) \; k \in [0, 2] \quad \text{Eqn 7(b)}$$

and $$\text{sign}(y_i, y_{i+1}, DTh) = \begin{cases} 1 & y_{odd} > y_{even} + DTh \\ -1 & y_{even} > y_{odd} + DTh \\ 0 & \text{otherwise} \end{cases} \quad \text{Eqn 7(c)}$$

Equation 7(a) enhances a low-contrasted comb value if the confidence of combing is high. Equation 7(b) and (c) calculates the confidence that a pixel is combing.

Figures 7, 7A, 7B:
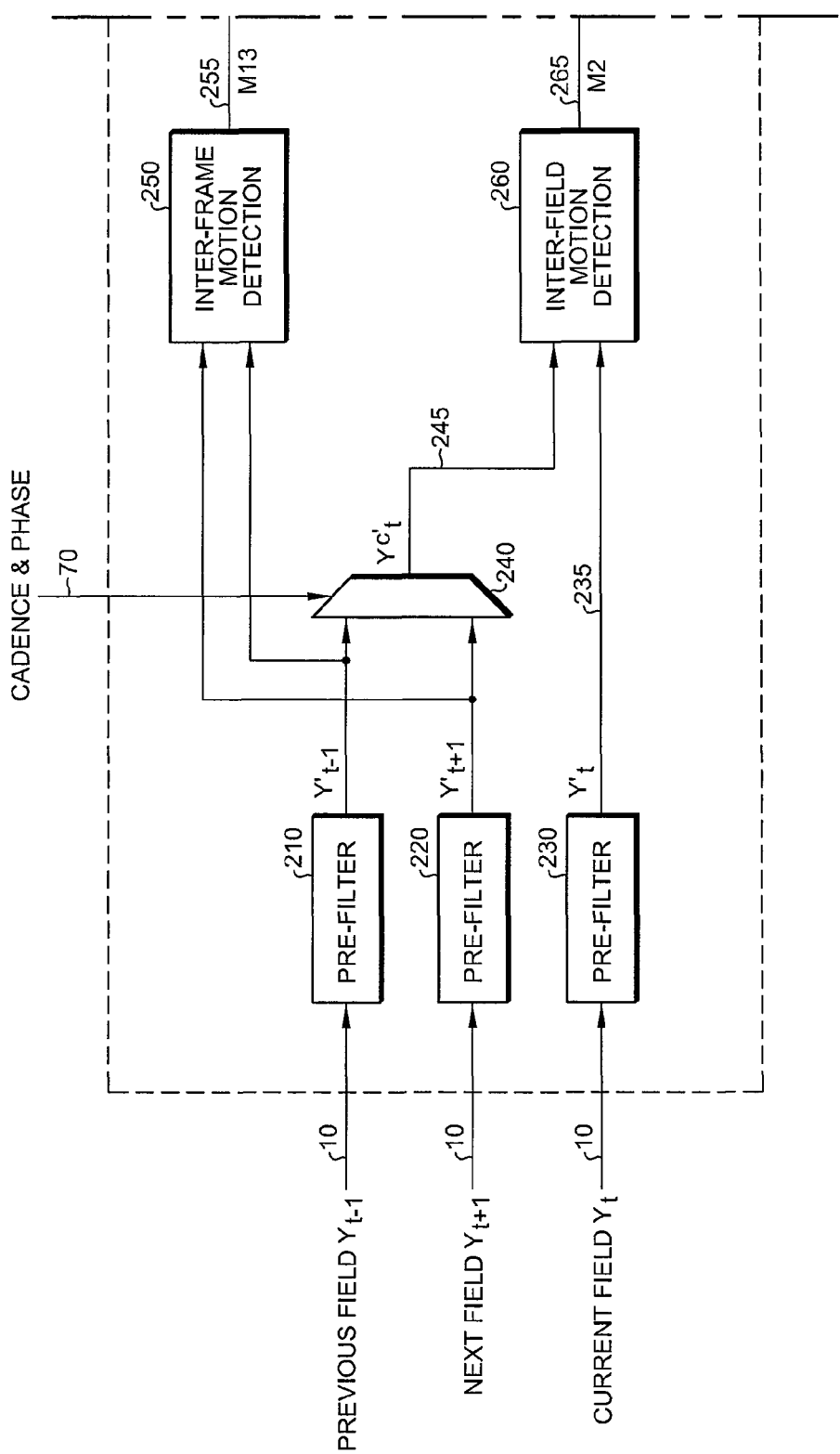
FIG. 7 is an exemplary diagram of a false motion excluded motion detector according to an embodiment of the invention.
Figure 7B:
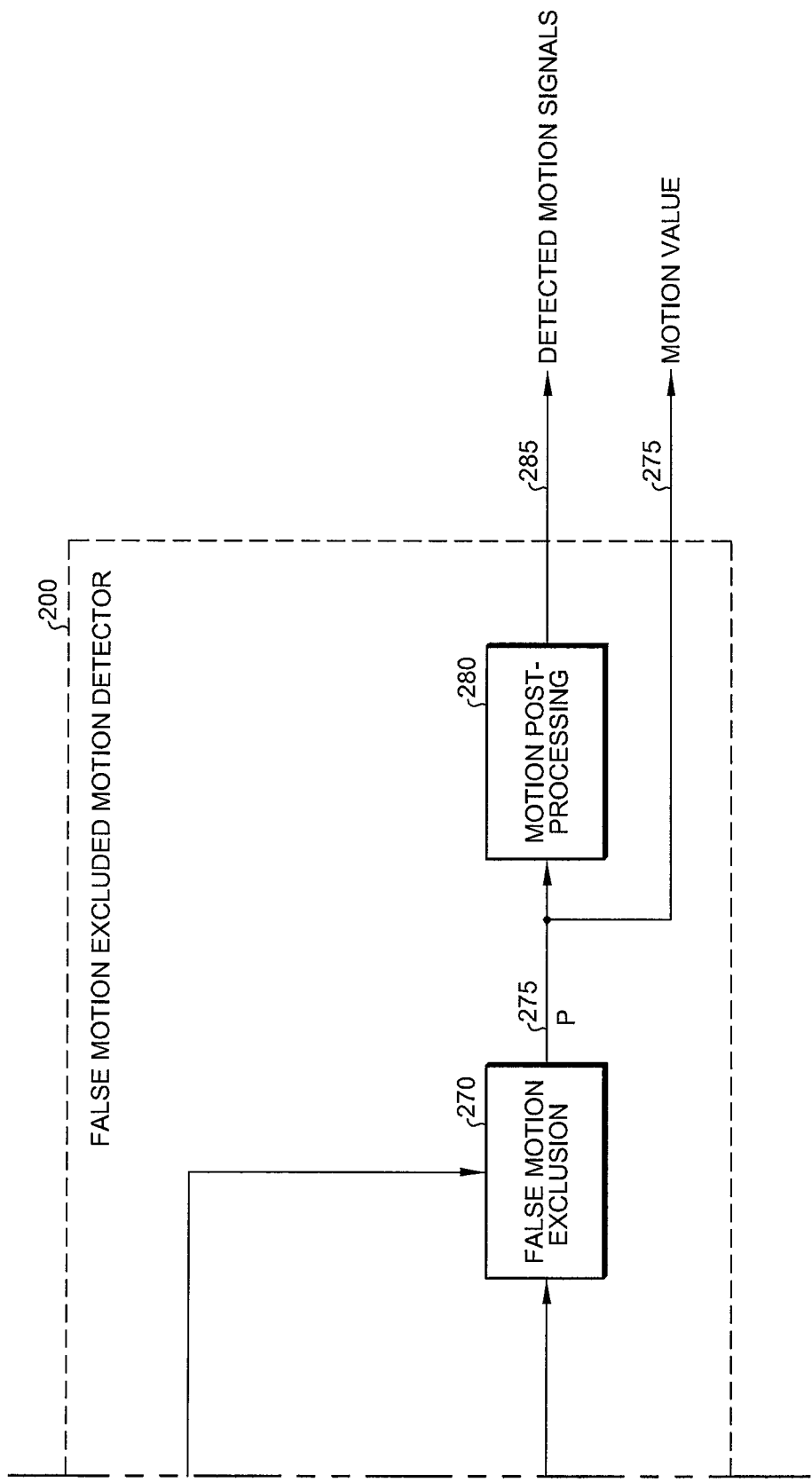

Referring now to FIG. 7, there is illustrated in diagram an embodiment of a false motion excluded motion detector 200.

The false motion excluded motion detector 200 receives three fields of the input video signal 10 at time t−1, t, and t+1, the cadence and phase information 70, and provides detected motion signals 285 and a motion value 275. The false motion excluded motion detector 200 further comprises optional pre-filters 210, 220, and 230 applied on the three input fields respectively, a multiplexer 240, an inter-frame motion detector 250, an inter-field motion detector 260, a false motion exclusion unit 270, and an optional motion post-processing unit 280.

Each of the optional pre-filters 210, 220, and 230 is configured to receive an input video field with its respective top/bottom parity signal, and provide a phase-adjusted output field with noise immunity. An example pre-filter is disclosed in U.S. patent application Ser. No. 12/978,154.

The multiplexer 240 receives the previous and the next field at t−1 and t+1, and selects one of them as the coupling field 245 to form a complete frame with the current field 235 at time t in accordance with the cadence and phase information 70 provided by an external film mode detector.

Figure 8:
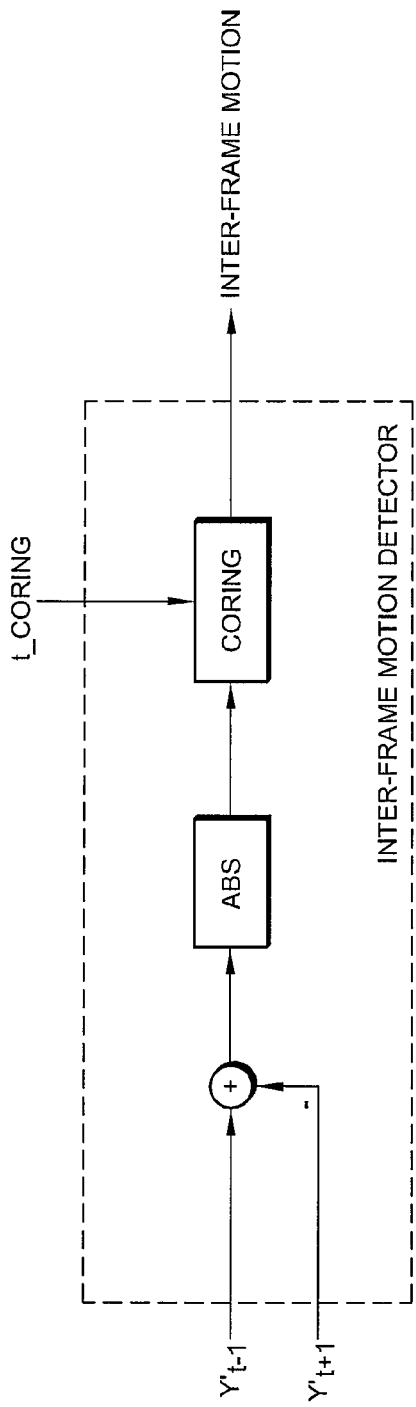
FIG. 8 is an exemplary diagram of an inter-frame motion detector according to an embodiment of the invention.

The inter-frame motion detection 250 is configured to receive the previous and the next field at time t−1 and t+1, and provides the inter-frame motion signal 255. An example embodiment of the inter-frame motion detection 250 is illustrated in FIG. 8.

Figure 9:
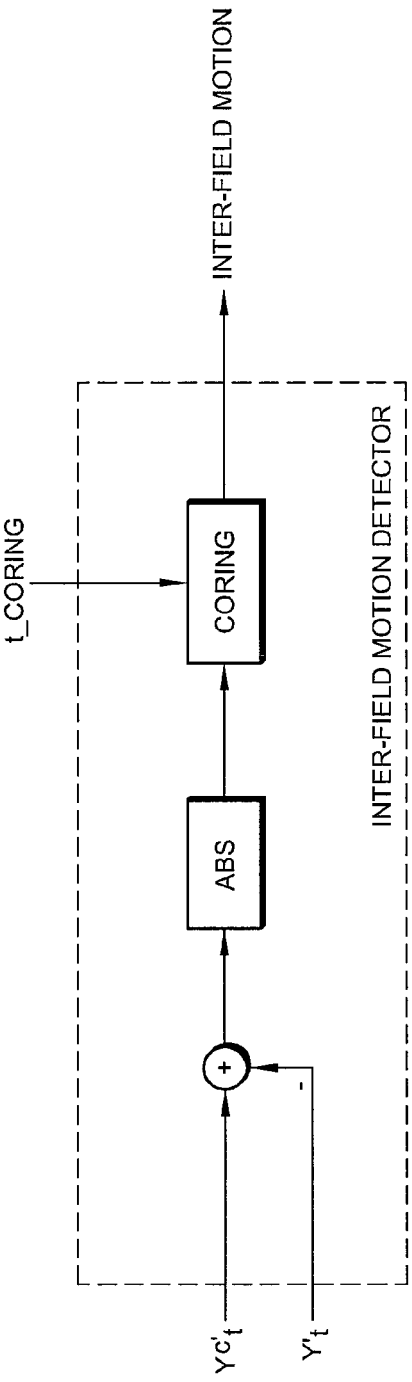
FIG. 9 is an exemplary diagram of an inter-field motion detector according to an embodiment of the invention.

Similarly, an example embodiment of the inter-field motion detection 260 is illustrated in FIG. 9. The inter-field motion detection 260 is configured to receive the two coupling fields 245 and 235 and provide the inter-field motion 265.

Figure 10:
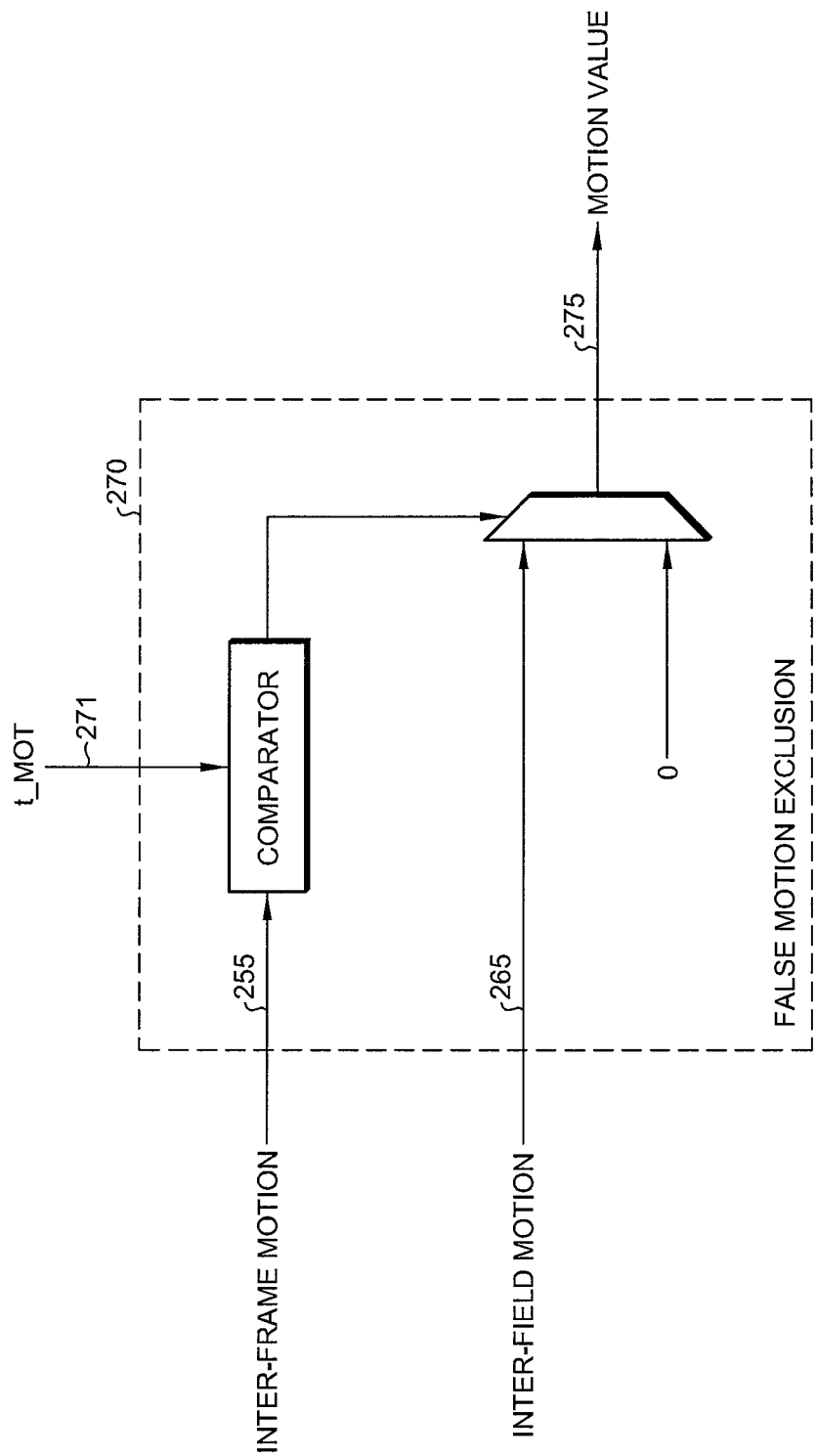
FIG. 10 is an exemplary diagram of a false motion exclusion unit according to an embodiment of the invention.

Based on the detected inter-frame and inter-field motion, the false alarms of the inter-field motion could be excluded by the false motion exclusion unit 270, with an example embodiment of the implementation shown in FIG. 10. In this example embodiment, the false motion exclusion unit 270 compares the inter-frame motion signal 255 with a pre-determined motion threshold 271, selects the received inter-field motion 265 or '0' according to the result of comparison, and provides the motion value 275. Other embodiments of the false motion exclusion unit 270 based on the inter-frame and inter-field motion signals could be easily derived by those of ordinary skilled in the art.

Figure 11:
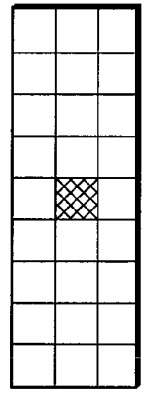
FIG. 11 is a diagram of an example processing window of a motion post-processing unit.

The optional motion post-processing unit 280 is configured to receive a plurality of the motion value 275, and provides a post-processed motion detection signal 285 to the video fader value estimator 300 for more robust in-frame motion detection. An example motion post-processing method is illustrated in Equation 8(a) and (b) with its local processing window shown in FIG. 11.

$$m\_mid = \quad \text{Eqn 8(a)}$$

$$\left(\sum_{i=-1}^{1} m_i \geq IFMotCntTh\right) \& \left(\sum_{i=-1}^{1} (m_i > 0) \geq IFMotCntInRowTh\right)$$

where $$m_i = \sum_{j=-4}^{4} (P_{i,j} > IFMotTh) \; i \in [-1, 1] \quad \text{Eqn 8(b)}$$

According to the embodiment, motion post-processing uses motions in neighboring pixels to reinforce the detection of a motion pixel. As a result, motion detection accuracy is further improved as the target motion pixel can be confirmed and higher confidence is obtained. Motion post-processing according to the embodiment calculates and outputs m_mid as the detected motion signal 285.

Figure 12:
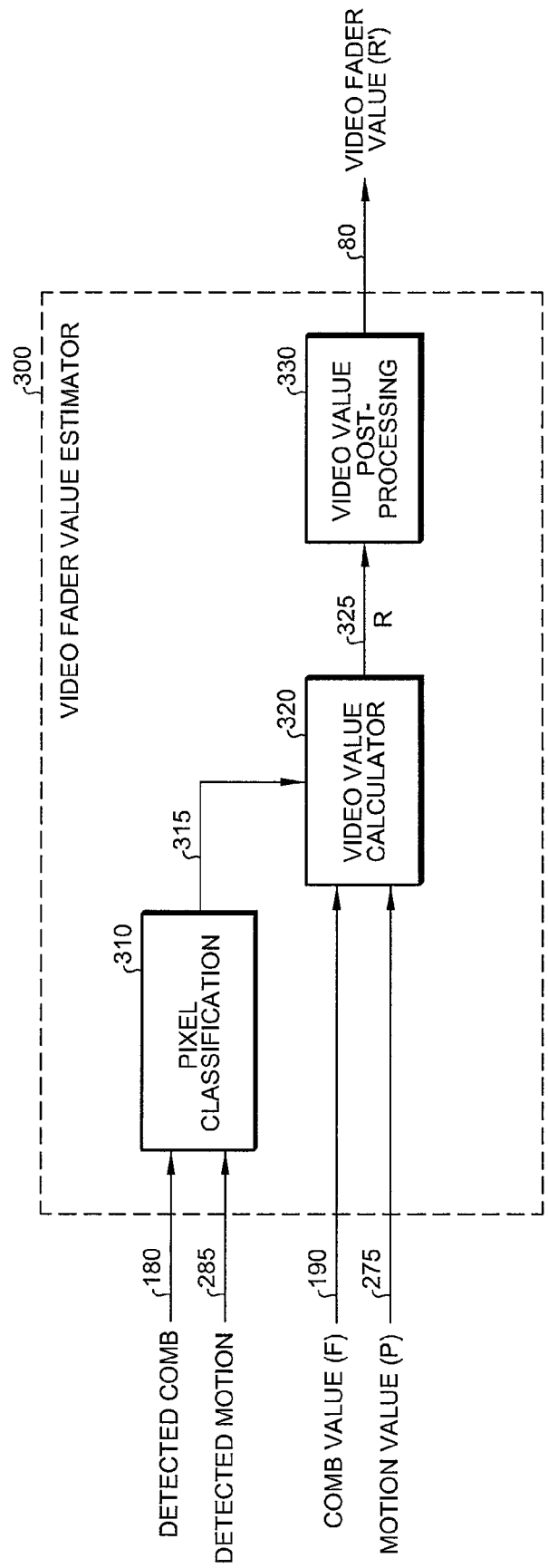
FIG. 12 is an exemplary diagram of a video fader value estimator according to an embodiment of the invention.

Referring now to FIG. 12, there is illustrated an embodiment of a video fader value estimator 300.

The video fader value estimator 300 receives the detected comb signal 180, the detected motion signal 285, the estimated comb value 190, and the motion value 275, and provides a video fader value 80. It further comprises a pixel classification unit 310, a video value calculator 320, and a video value post-processing unit 330.

The pixel classification unit 310 receives the detected comb signal 180 and the detected motion signal 285, and provides the classification result 315 of the video pixel to the video value calculator 320.

The video value calculator 320 then receives the comb value 190, the motion value 275, and the classification result 315, and provides a better represented video value 325 based on the comb or in-frame motion classification.

Figure 13:
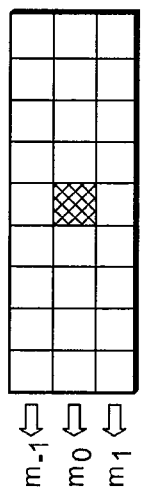
FIG. 13 is a diagram of an example processing window of a video value post-processing unit.

The optional video value post-processing unit 330 receives a plurality of the video values 325, and provides the video fader value 80 for better coverage of video pixels. An example video value post-processing method is illustrated in Equation 9 with its processing window shown in FIG. 13.

$$R' = \max_{i=0}^{26} (R_i) \quad \text{Eqn 9}$$

In an alternative embodiment, the present invention can be implemented in software as executed by a central processing unit. Software programming code, which can embody the present invention is typically accessed by a microprocessor from long-term, persistent storage media of some type, such as a flash drive or hard drive. The software programming code may be embodied in any of a variety of known media for use with a data processing system, such as a diskette, hard drive, or CD-ROM. The code may be distributed on such media, or may be distributed from the memory or storage of one computer system over a network of some type to other computer systems for use by such other systems. Alternatively, the programming code may be embodied in the memory of the device and accessed by a microprocessor using an internal bus. The techniques and methods for embodying software programming code in memory, on physical media, and/or distributing software code via networks are well known and will not be further discussed herein.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

We claim:

1. A local video detection apparatus, comprising:
    a contour and contrast adjusted comb detector;
    a false motion excluded motion detector; and
    a video fader value estimator coupled to the contour and contrast adjusted comb detector and the false motion excluded motion detector.

2. The apparatus of claim 1, wherein the contour and contrast adjusted comb detector comprises:
    a field to frame coupling unit;
    a directional support pixel extraction unit coupled to the field to frame coupling unit;
    a comb detection unit coupled to the directional support pixel extraction unit; and
    a comb value estimation unit coupled to the directional support pixel extraction unit.

3. The apparatus of claim 2, further comprising a comb post-processing unit coupled to the comb detection unit.

4. The apparatus of claim 2, further comprising a contrast adjustment unit coupled to the directional support pixel extraction unit and the comb value estimation unit.

5. The apparatus of claim 2, wherein the field to frame coupling unit is configured to receive input video signals at times t−1, t, and t+1 and merges a current field of the input video signal at time t with a coupling field of the input video signals at time t−1 or t+1, wherein the current field and the coupling fields belong to a same frame according to a cadence and phase information received from a film mode detector.

6. The apparatus of claim 2, wherein
    the directional support pixel extraction unit is coupled to a contour detection unit and is configured to extract pixels from a frame based on an estimated contour angle provided by a contour detection unit.

7. The apparatus of claim 2, wherein
    the comb detection unit is configured to calculate a comb signal of a pixel based on a vertical frequency according to the equation $$vfreq_k = \begin{cases} freq_{k,1} - freq_{k,2} & fielddiff_k \geq MonotoneTh \\ 0 & otherwise \end{cases} \quad k = 0, 1, 2$$

where $$freq_{k,1} = \sum_{i=0}^{3} ((y_{k+i} - mean_k) \cdot (y_{k+i+1} - mean_k) < 0)$$

$$freq_{k,2} = \sum_{i=0}^{2} ((y_{k+i} - mean_k) \cdot (y_{k+i+2} - mean_k) < 0)$$

-continued $$mean_k = ((y_k + y_{k+2} + y_{k+4}) \times 2 + (y_{k+1} + y_{k+3}) \times 3 + 6)/12$$

and $$fielddiff_k = |(y_k + y_{k+2} + y_{k+4}) \times 2 - (y_{k+1} + y_{k+3}) \times 3|/12.$$

8. The apparatus of claim 7, wherein the comb signal of the pixel takes into account comb pixels of a neighboring field.

9. The apparatus of claim 8, wherein the comb signal of the pixel is according to the equation $$C = \begin{cases} \max(vfreq_0, vfreq_1) & topfield \\ \max(vfreq_1, vfreq_2) & bottomfield. \end{cases}$$

10. The apparatus of claim 7, wherein the comb signal of the pixel excludes stationary comb pixels.

11. The apparatus of claim 10, wherein
    the comb detection unit is coupled to a motion detection unit providing a recursive motion value to the comb detection unit; and wherein
    the comb signal of the pixel is according to the equation $$C' = \begin{cases} C & m \geq MotionTh \\ 0 & otherwise \end{cases} \text{ where } m \text{ is the recursive motion}$$

where $$C = \begin{cases} \max(vfreq_0, vfreq_1) & topfield \\ \max(vfreq_1, vfreq_2) & bottomfield. \end{cases}$$

12. The apparatus of claim 3, wherein the comb post-processing unit calculates a post-processed comb signal of a pixel based on a plurality of comb signals of neighboring pixels.

13. The apparatus of claim 12, wherein the comb post-processing unit calculates the post-processed comb signal of the pixel according to the equations $$c\_mid1 = \left(\sum_{i=-1}^{1} l_i \geq DirCombCntThM\right) \& \left(\sum_{i=-1}^{1} (h_i > 0) \geq DirCombCntInRpwTh\right)$$

$$c\_mid2 = \left(\min(C'_{i-1,j} \quad C'_{i,j} \quad C'_{i+1,j}) \geq DirCombThH\right)$$

$$c\_low = \left(\sum_{i=-1}^{1} l_i \geq DirCombCntThL\right)$$

where $$h_i = \sum_{j=-4}^{4} (C'_{i,j} > DirCombThH) \quad i \in [-1, 1]$$

$$l_i = \sum_{j=-4}^{4} (C'_{i,j} > DirCombThL) \quad i \in [-1, 1].$$

14. The apparatus of claim 2, wherein the comb value estimation unit calculates a comb value of a pixel according to the equation $$f_k = (3 \times a_{k,1} - 4 \times a_{k,2})/12 \quad k \in [0, 2]$$

where $$a_{k,1} = \sum_{i=k}^{k+3} |y_i - y_{i+1}|$$

$$a_{k,2} = \sum_{i=k}^{k+2} |y_i - y_{i+2}|.$$

15. The apparatus of claim 2, wherein the comb value estimation unit calculates a comb value of a pixel according to the equations $$f_k = (3 \times a_{k,1} - 4 \times a_{k,2})/12 \; k \in [0, 2]$$

where $$a_{k,1} = \sum_{i=k}^{k+3} |y_i - y_{i+1}|$$

$$a_{k,2} = \sum_{i=k}^{k+2} |y_i - y_{i+2}|$$

$$f = \max(f_0, f_1, f_2).$$

16. The apparatus of claim 4, wherein the contrast adjustment unit is configured to calculate a contrast adjusted comb value for a low contrasted but highly confident comb pixel based on a comb value of a pixel.

17. The apparatus of claim 16, wherein the contrast adjusted comb value is according to the equation $$F \begin{cases} \max(MinContras\, t, f) & \max(|b_0|, |b_1|, |b_2|) \geq 4 \\ f & \text{otherwise} \end{cases}$$

where $$b_k = \sum_{i=k}^{k+3} \text{sign}(y_i, y_{i+1}, DTh) \; k \in [0, 2]$$

and $$\text{sign}(y_i, y_{i+1}, DTh) = \begin{cases} 1 & y_{odd} > y_{even} + DTh \\ -1 & y_{even} > y_{odd} + DTh \\ 0 & \text{otherwise.} \end{cases}$$

18. The apparatus of claim 1, wherein the false motion excluded motion detector comprises:
   a multiplexer configured to select a coupling field from a previous field and a next field to form a complete frame with a current field;
   an inter-frame motion detection unit;
   an inter-field motion detection unit coupled to the multiplexer; and
   a false motion exclusion unit coupled to the inter-frame motion detection unit and the inter-field motion detection unit.

19. The apparatus of claim 18, further comprising a motion post-processing unit coupled to the false motion exclusion unit.

20. The apparatus of claim 18, wherein the current field, previous field, and next field are pre-processed by pre-filter units configured to provide phase-adjusted fields with noise immunity.

21. The apparatus of claim 18, wherein the multiplexer is configured to select the coupling field according to a cadence and phase information provided by a film mode detector.

22. The apparatus of claim 18, wherein the inter-frame motion detection unit is configured to receive the previous field and the next field and provide an inter-frame motion signal.

23. The apparatus of claim 18, wherein the inter-field motion detection unit is configured to receive the coupling field and the current field and provide an inter-field motion signal.

24. The apparatus of claim 18, wherein the false motion exclusion unit is configured to compare a received inter-field motion value and a pre-determined motion threshold and select the received inter-field motion value or '0' according to a result of the comparison as a motion value.

25. The apparatus of claim 19, wherein the motion post-processing unit is configured to receive a plurality of motion values and provide a post-processed motion detection signal according to the equation $$\text{m\_mid} = \left( \sum_{i=-1}^{1} m_i \geq IFMotCntTh \right) \& \left( \sum_{i=-1}^{1} (m_i > 0) \geq IFMotCntInRowTh \right)$$

where $$m_i = \sum_{j=-4}^{4} (P_{i,j} > IFMotTh) \; i \in [-1, 1].$$

26. The apparatus of claim 1, wherein the video fader value estimator comprises:
   a pixel classification unit; and
   a video value calculator coupled to the pixel classification unit.

27. The apparatus of claim 26, further comprising a video value post-processing unit coupled to the video value calculator.

28. The apparatus of claim 26, wherein the pixel classification unit is configured to receive a detected comb signal and a detected motion signal and provide a pixel classification result based on the received signals.

29. The apparatus of claim 26, wherein the video value calculator is configured to receive a comb value, a motion value, and a pixel classification result and provide a video value based on the received comb value, motion value, and pixel classification result.

30. The apparatus of claim 27, wherein the video value post-processing unit is configured to receive a plurality of video values and calculate a video fader value based on the plurality of video values.

31. The apparatus of claim 30, wherein the video fader value is according to the equation $$R' = \max_{i=0}^{26} (R_i).$$

32. A local film/video mode processing apparatus, comprising:
   a film mode detector;
   a local video detector coupled to the film mode detector;
   a film mode processing unit;
   a video mode processing unit; and
   a fader coupled to the local video detector, the film mode processing unit, and the video mode processing unit, wherein the local video detector comprises:
a contour and contrast adjusted comb detector;
a false motion excluded motion detector; and
a video fader value estimator coupled to the contour and contrast adjusted comb detector and the false motion excluded motion detector.

33. The local film/video mode processing apparatus of claim 32, wherein the film mode processing unit processes inverse telecine.

34. The local film/video mode processing apparatus of claim 32, wherein the video mode processing unit processes de-interlacing.

35. A television (TV) and/or a set-top-box (STB) device comprising the local film/video mode processing apparatus of claim 32.

36. A method of local film/video processing, comprising:
   detecting a cadence and phase information from an input video;
   calculating pixel-based video confidence values of the input video based on the cadence and phase information;
   performing a film mode processing on the input video;
   performing a video mode processing on the input video; and
   fading between the film mode processing and the video mode processing according to the pixel-based video confidence values,
   wherein calculating pixel-based video confidence values comprises:
      calculating contour and contrast adjusted comb signals and a comb value for each pixel of the input video;
      calculating false motion excluded motion signals and a motion value for each pixel of the input video; and
      calculating pixel-based confidence values according to the comb signals, comb values, motion signals, and motion values.

37. The method of local film/video processing of claim 36, wherein performing the film mode processing is performing inverse telecine.

38. The method of local film/video processing of claim 36, wherein performing the video mode processing is performing de-interlacing.

39. The method of local film/video processing of claim 36, wherein performing the film mode processing comprises:
   receiving the input video;
   interweaving coupling fields of the input video into merged video frames according to the cadence and phase information from an input video; and
   outputting the merged video frames.

40. The method of local film/video mode processing of claim 36, wherein performing the video mode processing comprises:
   receiving the input video;
   interpolating fields of the input video spatially and/or temporally to interpolated frames; and
   outputting the interpolated frames.

* * * * *

UNITED STATES PATENT AND TRADEMARK OFFICE
CERTIFICATE OF CORRECTION

PATENT NO. : 8,471,962 B2
APPLICATION NO. : 13/174194
DATED : June 25, 2013
INVENTOR(S) : Xiaoyun Deng et al.

It is certified that error appears in the above-identified patent and that said Letters Patent is hereby corrected as shown below:

In the Claims

Column 11, line 24 after $$f_k = (3 \times a_{k,1} - 4 \times a_{k,2})/12 \qquad k \in [0,2]$$

where $\quad a_{k,1} = \sum_{i=k}^{k+3} |y_i - y_{i+1}|$ $$a_{k,2} = \sum_{i=k}^{k+2} |y_i - y_{i+2}|$$

insert --and--

Signed and Sealed this
Tenth Day of September, 2013

Teresa Stanek Rea
*Acting Director of the United States Patent and Trademark Office*